United States Patent [19]
Akedo et al.

[11] Patent Number: 5,424,834
[45] Date of Patent: Jun. 13, 1995

[54] OPTICAL DISPLACEMENT SENSOR FOR MEASUREMENT OF SHAPE AND COARSENESS OF A TARGET WORKPIECE SURFACE

[75] Inventors: Jun Akedo; Yuichi Okazaki, both of Tsukuba, Japan

[73] Assignee: Agency of Industrial Science & Technology, Ministry of International Trade & Industry, Tokyo, Japan

[21] Appl. No.: 77,931

[22] Filed: Jun. 18, 1993

[30] Foreign Application Priority Data

Jun. 19, 1992 [JP] Japan .................. 4-186114

[51] Int. Cl.⁶ .................. G02B 5/30; G01B 11/03
[52] U.S. Cl. .................. 356/371; 356/360; 356/366; 356/127; 359/19
[58] Field of Search .................. 356/371, 4, 376, 372, 356/432, 359, 360, 366–369, 127, 152; 250/201.5, 201.4, 560, 561; 359/19

[56] References Cited

U.S. PATENT DOCUMENTS

| | | | |
|---|---|---|---|
| 4,390,277 | 6/1983 | Quinn | 356/371 |
| 4,656,348 | 4/1987 | Ando | 250/201.5 |
| 4,844,617 | 7/1989 | Kelderman et al. | 356/372 |
| 5,062,715 | 1/1991 | Nakata et al. | 356/432 |
| 5,161,040 | 11/1992 | Yokoyama et al. | 359/19 |
| 5,206,868 | 4/1973 | Deacon | 359/326 |

Primary Examiner—Robert P. Limanek
Assistant Examiner—Alexander Oscar Williams
Attorney, Agent, or Firm—Oblon, Spivak, McClelland, Maier, & Neustadt

[57] ABSTRACT

An optical displacement sensor that has a light beam polariscope located on the light path of light reflected from a target surface, and means for detecting the focal point position and transverse position of the light beam from the polariscope. The focal point position corresponds to axial displacement at the target surface, and the transverse position corresponds to inclination of the target surface, so the effect of the inclination of the surface can be compensated for by using a transverse position detection signal to adjust the light beam polariscope.

7 Claims, 6 Drawing Sheets

FIG.4(A) F<0 θ=0
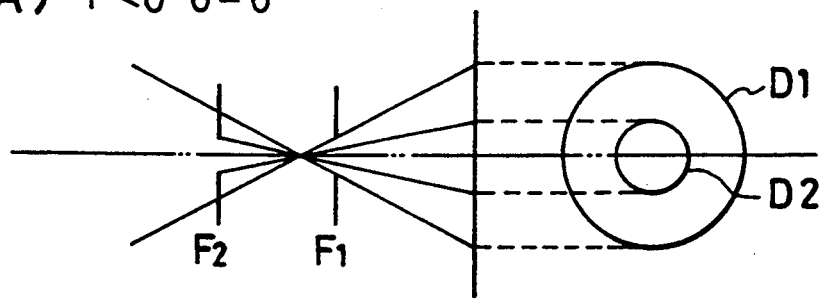
FIG.4(B) F<0 θ>0
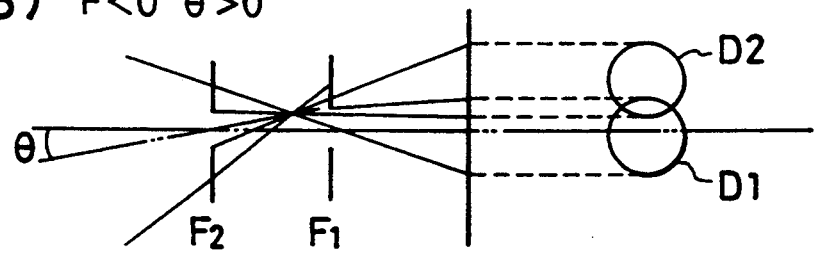
FIG.4(C) F>0 θ=0
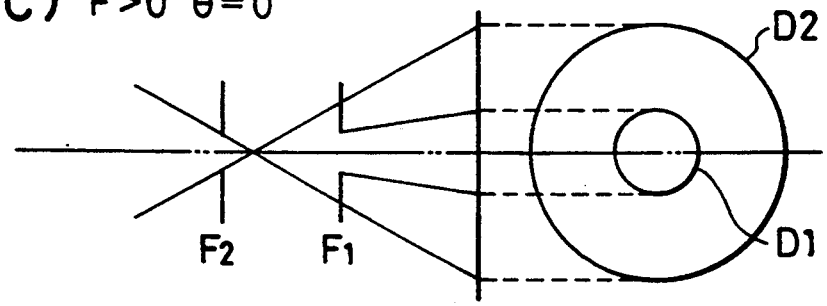
FIG.4(D) F>0 θ>0
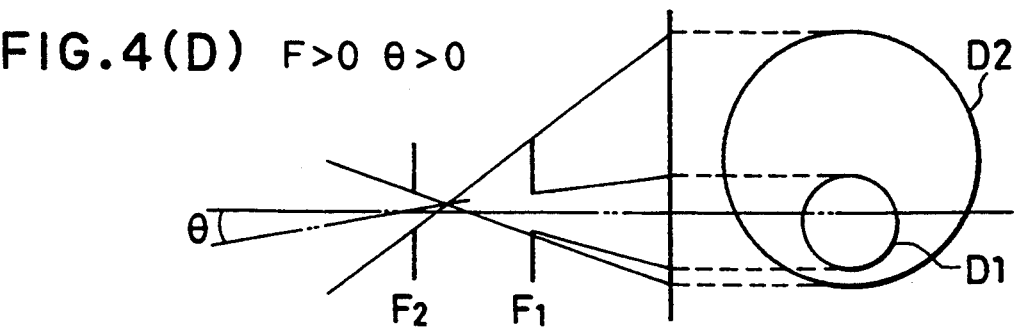

OPTICAL DISPLACEMENT SENSOR FOR MEASUREMENT OF SHAPE AND COARSENESS OF A TARGET WORKPIECE SURFACE

BACKGROUND OF THE INVENTION

1. Field of the Invention

This invention relates to an optical displacement sensor for high-sensitivity measurement of the surface shape and roughness of workpieces and the like.

2. Description of the Prior Art

The surface shape and roughness of workpieces are important factors in the evaluation of machining characteristics. Recently machining is being applied to spherical and aspherical mirrors. For this, the workpiece surface is measured and this data is fed back to the machining section. In such cases the roughness of the workpiece mirror surface may be in the order of 10 nm, for example. Therefore it is necessary to use a high precision, high sensitivity displacement sensor to measure the roughness of such a surface. In the prior art, optical displacement sensors have been developed that use critical angle focus error detection or astigmatic focus error detection to perform non-contact measurement of such workpiece surfaces, and these sensors have been applied to very high precision in-process measurement. A typical arrangement of a conventional optical displacement sensor of this type is shown in FIG. 9. Light from a laser diode 12 is reflected by a semi-reflecting mirror 4 and a mirror 6b and projected onto a target surface 14 of a workpiece by an optical probe that has a set of objective lenses 2, and the light reflected by the surface is detected by a four-piece photodiode 40. The ups and downs of surface irregularities produce a corresponding change in the position of the focal point F1 along the axis of the light beam, causing the shape of the light spot on the four-piece photodiode 40 to change shape, so the four-piece photodiode 40 measures these changes in the shape of the light to thereby detect irregularities on the target surface 14. However, the sensor cannot distinguish the direction of these changes in the position of the focal point F1, that is, whether a surface irregularity is positive or negative. To allow the direction to be discriminated, there are arrangements that use a cylindrical lens 37 whereby positional changes in the focal point F1 produce a corresponding change in the direction of distortion of the light spot on the four-piece photodiode 40.

With a conventional optical displacement sensor thus arranged, if the light beam point of reflection on the surface is at an angle $\theta$ with respect to the light axis, the angle of the reflected light will be $2\theta$ relative to the incident light beam, so a large angle $\theta$ can result in the reflected light not entering the optical detection system. Moreover, there is also a tendency for information relating to target surface inclination to interfere with information relating to target surface irregularities, increasing the error in measurements of target surface irregularities. There is therefore an increasing need for an optical displacement sensor whereby, when a target surface is inclined, can apply correction so that the light reflecting from the surface passes correctly along the axis of the optical system, thereby enabling measurement to be carried out with high precision, unaffected by the inclination of the target surface.

OBJECT AND SUMMARY OF THE INVENTION

An object of the present invention is therefore to provide an optical displacement sensor that is able to correct for inclination of a target measurement surface so that light reflected from the target surface passes correctly along the axis of the optical system to thereby enable measurement to be carried out with high precision, unaffected by the target surface inclination.

In accordance with the present invention, this object is attained by an optical displacement sensor comprising a light source, objective lenses for projecting light from the light source onto a target workpiece surface, a light beam polariscope that polarizes reflected light from the target workpiece surface and controls the direction of the outgoing light beam, and focal point position and transverse position detection means for detecting the focal point position and transverse position of light from the light beam polariscope.

Light from the light source enters the light beam polariscope, is reflected by a mirror therein, passes through an objective lenses and impinges on the target surface. Light reflected by the target surface passes back through the objective lenses and is reflected onto the focal point position and transverse position detection means by the mirror in the light beam polariscope, whereby the focal point position and transverse position of the light are detected. As the position of the focal point of the light beam indicates target surface displacement along the axis of the light beam, target surface irregularities can be measured with high precision. The transverse position of the light beam indicates the inclination of the light beam, so the effect of the inclination of the target surface can be compensated for by using the transverse position detection signal to adjust the light beam polariscope.

Further features of the invention, its nature and various advantages will be more apparent from the accompanying drawings and following detailed description of the invention.

BRIEF DESCRIPTION OF THE DRAWINGS

FIG. 4(A) to (D) show the relationship between the quantity of light detected by the two detectors, and the position of the focal point;

DESCRIPTION OF THE PREFERRED EMBODIMENT

Figure 1:
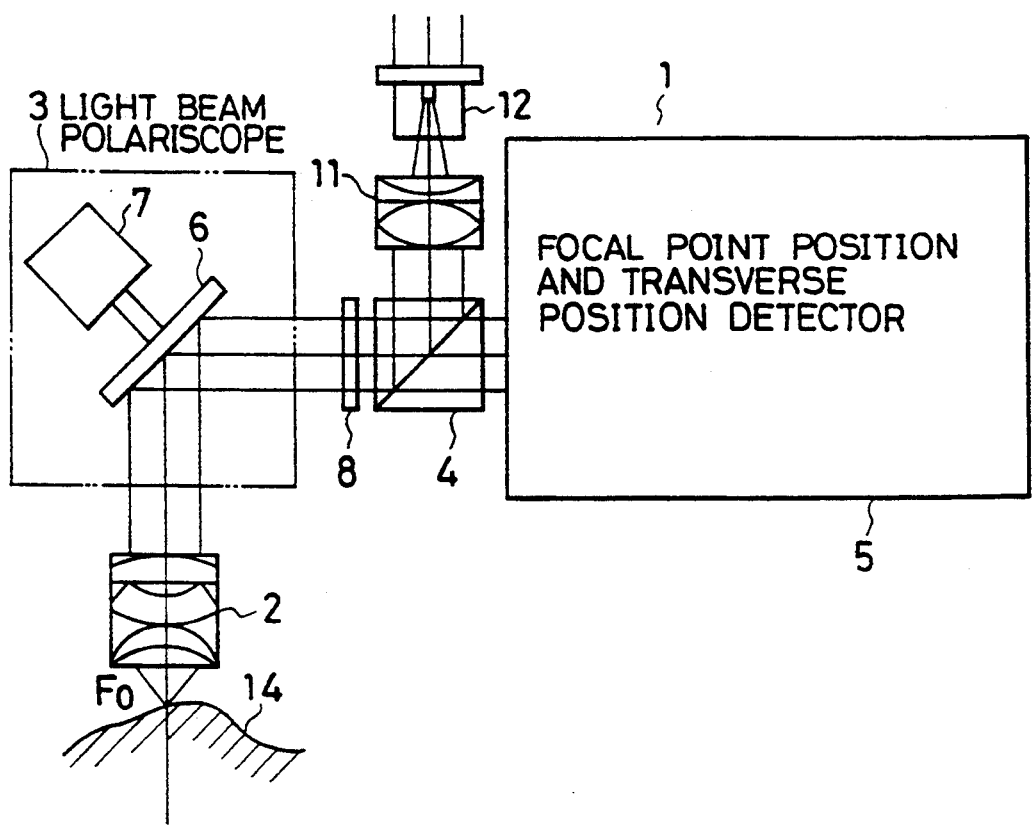
FIG. 1 shows the arrangement of a first embodiment of the optical displacement sensor according to this invention
Figure 8:
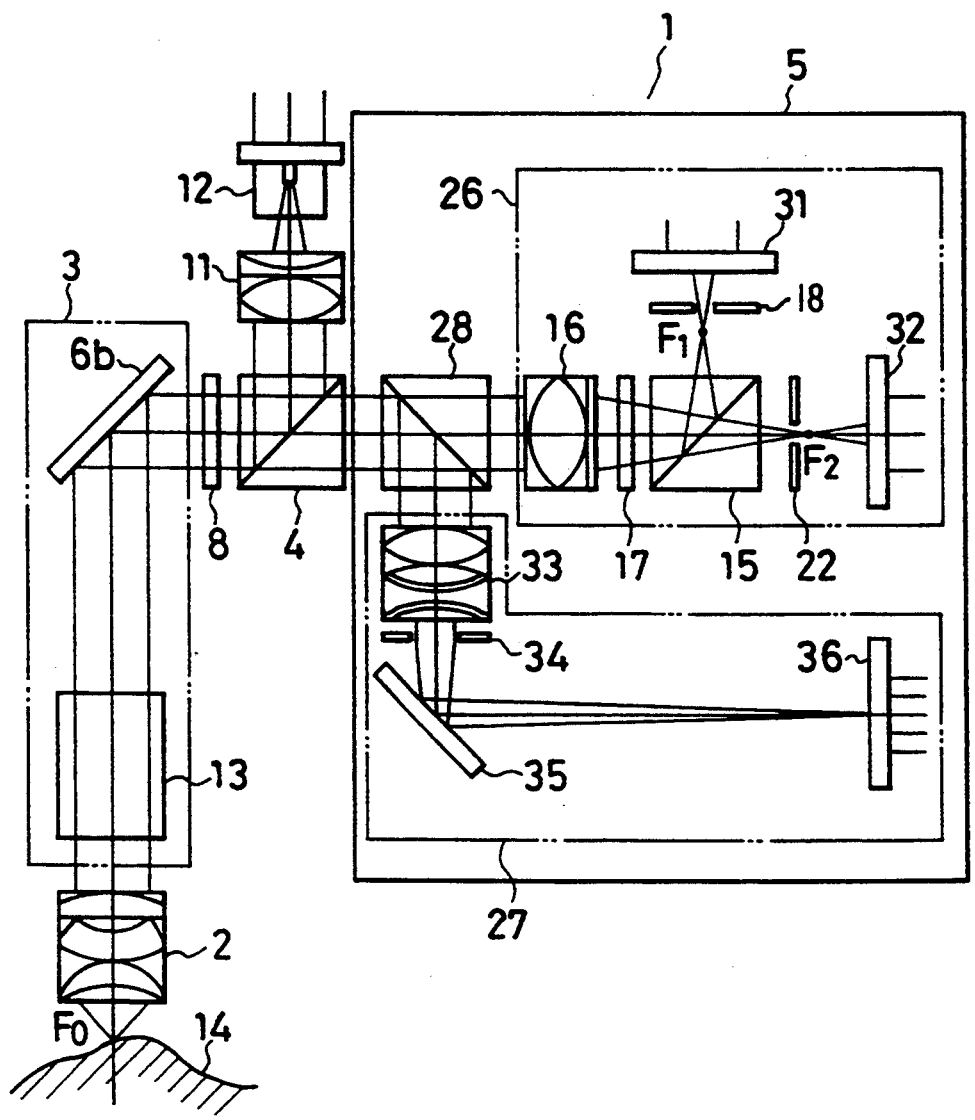
FIG. 8 shows the arrangement of a fifth embodiment of the optical displacement sensor according to this invention.
Figure 9:
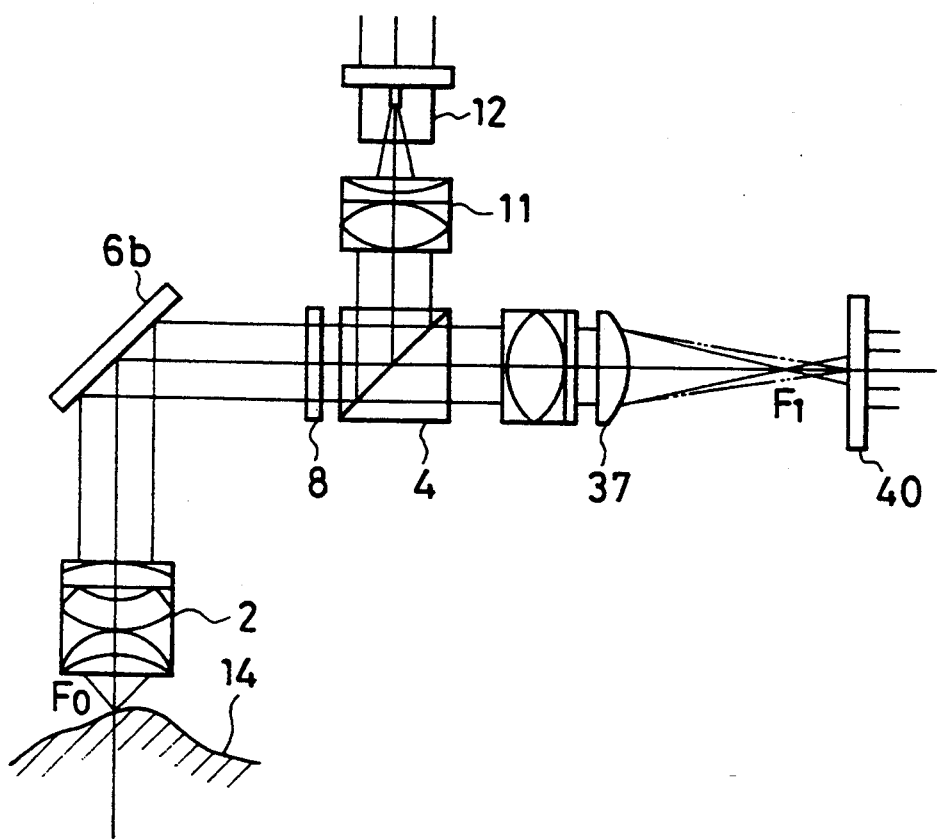
FIG. 9 shows the arrangement of a conventional optical displacement sensor.

In the basic configuration of the optical displacement sensor of the invention shown in FIG. 1, the optical displacement sensor 1 is provided with a objective lenses 2, light beam polariscope 3, semi-reflecting mirror 4 and focal point position and transverse position detector 5. The light beam polariscope 3 polarizes the incident light beam and controls the direction of the outgoing light beam. In this embodiment, the light beam polariscope 3 is constituted by a mirror 6 and mirror drive unit 7. The mirror 6 can be moved and adjusted by the mirror drive unit 7. In accordance with another embodiment shown in FIG. 8, the light beam polariscope 3 can be constituted by a fixed mirror 6b and crystal polarizing device 13. A quarter-wavelength plate 8 is disposed between the light beam polariscope 3 and the semi-reflecting mirror 4. Collimator lenses 11 and a laser diode 12 as the light source are arranged on the entry side of the semi-reflecting mirror 4.

The focal point position and transverse position detector 5 is for detecting the focal point position and transverse position of light from the semi-reflecting mirror 4 reflecting from a target surface 14. This transverse position optical detection system detects axial deviation in light reflecting from the target surface 14, relative to the optical axis of the focal point position optical detection system, and the detection signal is used as feedback to bring the axis of the light reflecting from the target surface 14 into alignment with the optical axis of the focal point position detection system. The focal point position and transverse position detector 5 thus includes an optical detection system for detecting the focal point position and an optical detection system for detecting the transverse position, which may be integrated to form a single system or provided as separate systems.

Figure 2:
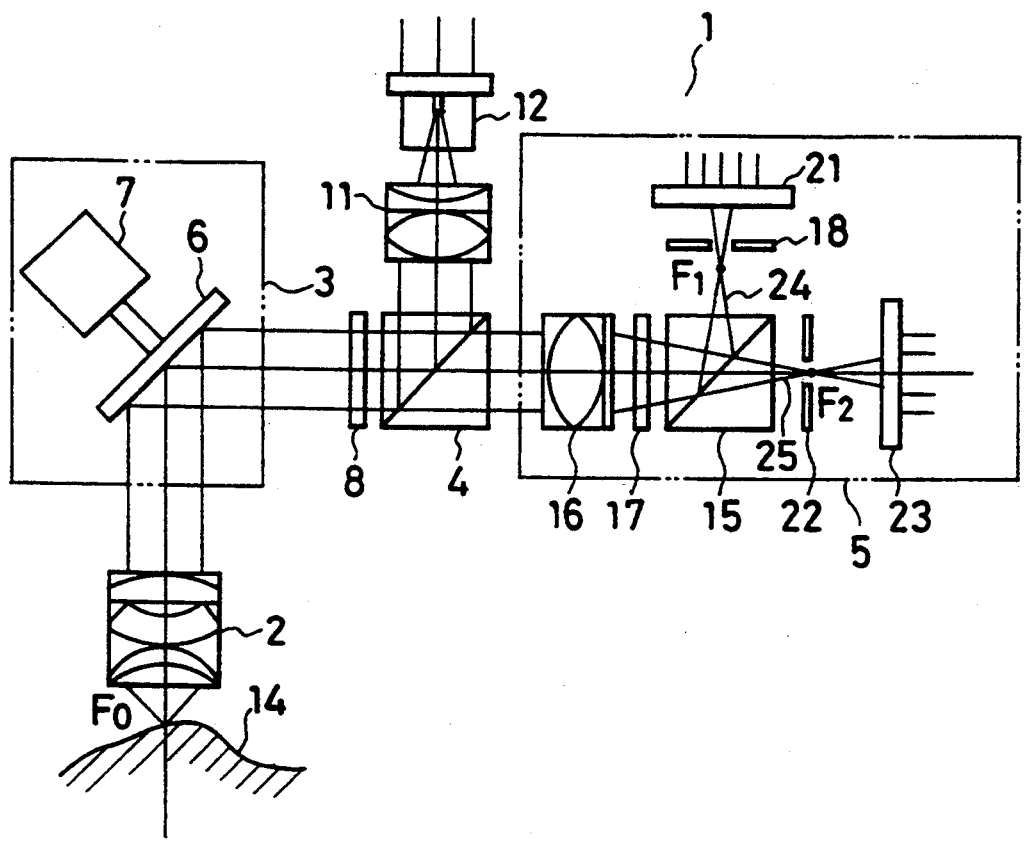
FIG. 2 shows the arrangement of a second embodiment of the optical displacement sensor according to this invention.

The description will relate first to an embodiment arrangement in which the focal point position detection system and transverse position detection system of the focal point position and transverse position detector 5 are integrated into a single system. Thus, as shown in FIG. 2, the focal point position and transverse position detector 5 is provided with a first polarizing beam splitter 15 and a half-wavelength plate 17 is arranged between the semi-reflecting mirror 4 and the first polarizing beam splitter 15. A first pinhole 18 and first semiconductor light position detector 21 are provided on the reflected light side of the first polarizing beam splitter 15 and a second pinhole 22 and second semiconductor light position detector 23 are provided on the transmitted light side of the first polarizing beam splitter 15. Here, what is important is that at the reference position of the optical system the first pinhole 18 should be closer to the first light position detector 21 than to the focal point position F1 of the light beam at the reference position, and that the second pinhole 22 should be closer to the first polarizing beam splitter 15 than to the focal point position F2 of the light beam at the reference position. The first light position detector 21 and second light position detector 23 are equipped with a centroid detection function for detecting the centroid of the detected light spot.

The detection principle used by the optical displacement sensor thus configured to detect irregularities on the target surface of an object will now be described. Light emitted by the laser diode 12 passes through the collimator lenses 11 and impinges on the semi-reflecting mirror 4, is thereby reflected through the quarter-wavelength plate 8 into the light beam polariscope 3, wherein it is reflected by the mirror 6, passes through the objective lenses 2 and impinges on the target surface 14. The light reflected by the target surface 14 passes through the objective lenses 2, is reflected by the mirror 6, passes through the quarter-wavelength plate 8, semi-reflecting mirror 4, lens 16 and half-wavelength plate 17 and impinges on the first polarizing beam splitter 15. The first polarizing beam splitter 15 splits the incident beam into beams 24 and 25. Light beam 24 converges at focal point position F1, from which point it diverges as it passes through the first pinhole 18 and forms a spot on the first light position detector 21.

As shown by FIG. 4, changing the focal point position F1 changes the size of the spot on the first light position detector 21. The other light beam 25 formed by the first polarizing beam splitter 15 passes through the second pinhole 22, and after converging at focal point position F2 diverges and forms a spot on the second light position detector 23. Therefore, changing the focal point position F2 changes the size of the spot on the second light position detector 23. Part of the light beam 24 is cut at the first pinhole 18 in accordance with the position of the focal point F1, so the quantity of light detected by the first light position detector 21 corresponding to the focal point position F1 will be as indicated by curve PD1 of FIG. 3. In the same way, part of the light beam 25 is cut at the second pinhole 22 in accordance with the position of the focal point F1, so the quantity of light received by the second light position detector 23 corresponding to the focal point position F1 will be as indicated by curve PD2 of FIG. 3.

Figure 3:
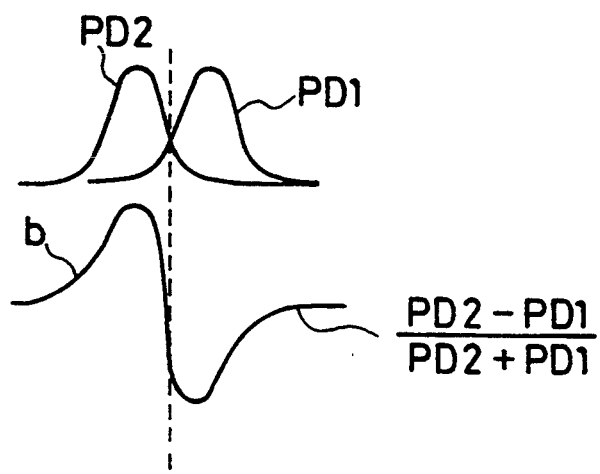
FIG. 3 is a graph showing the output of each of the two detectors in the optical displacement sensor of the invention, and the differential between the outputs.

Using (PD2−PD1)/(PD2+PD1) to obtain the difference between the quantities of light detected by the first and second light position detectors 21 and 23 provides a curve such as curve b of FIG. 3. As can be seen from curve b, when both focal points are at the reference position the quantities of light detected by light position detectors 21 and 23 are the same, so the differential is zero. If the focal points move forwards towards the light position detectors, the light quantity received by the first light position detector 21 increases while the light quantity received by the second light position detector 23 decreases (see FIG. 4 (A)), increasing the positive differential between the quantities of light received by the two light position detectors. If the two focal points move nearer to the first polarizing beam splitter 15, the quantity of light detected by the first light position detector 21 decreases while the quantity of light detected by the second light position detector 23 increases (see FIG. 4 (C)), increasing the negative differential between the received light quantities. As these changes in differential between the received light quantities indicated by curve b of FIG. 3, meaning the changes in the position of the focal points, correspond to changes in the position of the focal point of the objective lenses 2 arising from irregularities on the target surface 14, curve b can be used to measure such irregularities on thee target surface 14. If the target surface 14 measurement portion at the focal point Fo of the objective lenses 2 is inclined, the two outgoing light beams 24 and 25 from the first polarizing beam splitter 15 will have a transverse deviation relative to the optical axis. As a result the light beams will not be equally cut by the first pinhole 18 and second pinhole 22 (see FIG. 4 (B) and (D)), causing a shift in the shape of the light spot on the first light position detector 21 and second light position detector 23. Thus, the inclination of the target portion can be detected by the detection of the centroid position of the shifted spot by the light position detector 21 or 23. When reflected light from a target surface portion having a large inclination is reflected by the mirror 6, the degree of deviation from the optical axis may be so large that the reflected light does not enter the first polarizing beam splitter 15. In such a case, signals from the light position detector 21 or 23 can be used as a basis for adjusting the mirror, using the mirror drive unit 7, to bring the spot centroid back into alignment with the optical axis.

Figure 5:
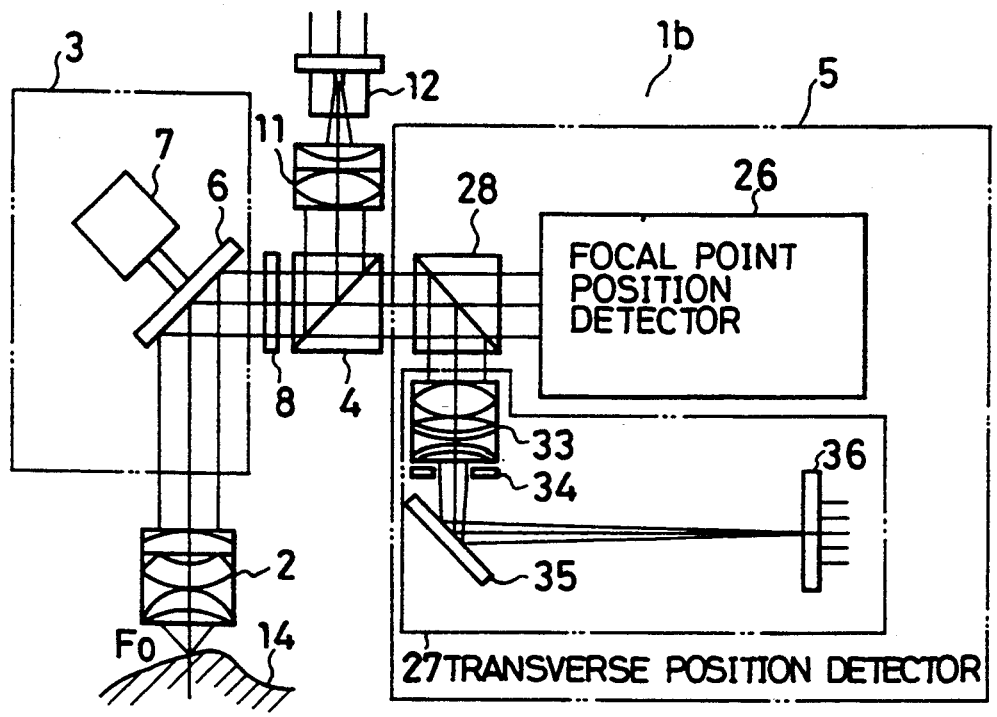
FIG. 5 shows the arrangement of a third embodiment of the optical displacement sensor according to this invention.
Figure 6:
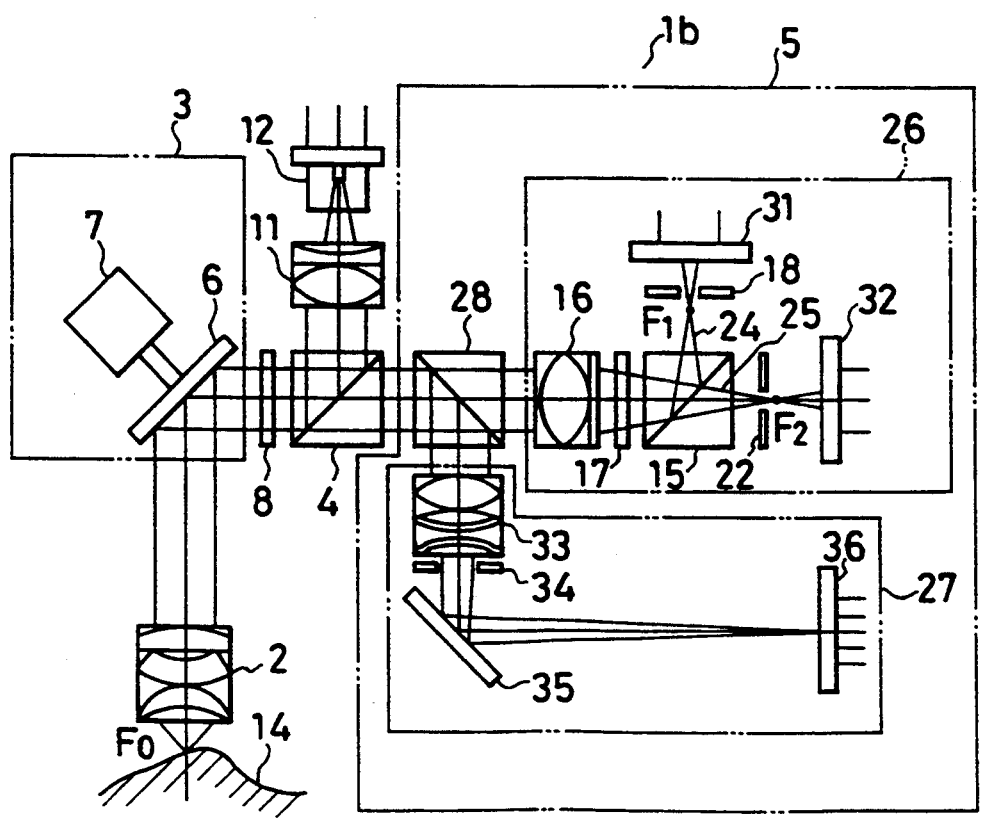
FIG. 6 shows the arrangement of a fourth embodiment of the optical displacement sensor according to this invention.

The above description of the embodiment related to an arrangement in which the focal point position detection system and transverse position detection system of the focal point position and transverse position detector 5 are integrated into a single system. An embodiment will now be described in which separate optical systems are used for the detection of focal point position and transverse position. FIG. 5 shows a optical displacement sensor 1b according to this embodiment. The optical displacement sensor 1b is provided with a focal point position detection system 26 and transverse position detection system 27 to perform the functions of the above focal point position and transverse position detector 5, and a second polarizing beam splitter 28. As shown by FIG. 6, the focal point position detection system 26 has a first polarizing beam splitter 15, and a lens 16 and half-wavelength plate 17 arranged between the second polarizing beam splitter 28 and the first polarizing beam splitter 15. A first pinhole 18 and first light detector 31 are provided on the reflected light side of the first polarizing beam splitter 15 and a second pinhole 22 and second light detector 32 are provided on the transmitted light side of the first polarizing beam splitter 15. The important point here is the same as in the embodiment of FIG. 2, that at the reference position of the optical system the first pinhole 18 should be closer to the first light detector 31 than to the focal point position F1 of the light beam at the reference position, and that the second pinhole 22 should be closer to the first polarizing beam splitter 15 than to the focal point position F2 of the light beam at the reference position. The transverse position detection system 27 is provided with lenses 33, a third pinhole 34, a mirror 35 and a semiconductor light position detector 36, and arranged so that the outgoing light beam from the second polarizing beam splitter 28 is converged by lenses 33, passes through the third pinhole 34 and is deflected by mirror 35 to impinge on the semiconductor light position detector 36.

The detection principle used by the optical displacement sensor 1b configured thus to detect irregularities on the target surface 14 of a measurement object will now be described. Light produced by the laser diode 12 passes through the collimator lenses 11 to the semi-reflecting mirror 4, is thereby reflected through the quarter-wavelength plate 8 into the light beam polariscope 3, where it is reflected by the mirror 6, and passes through the objective lenses 2 onto the target surface 14. Reflected light from the target surface 14 passes back through the objective lenses 2, and after being reflected by the mirror 6 passes through the quarter-wavelength plate 8 and semi-reflecting mirror 4 to the focal point position and transverse position detector 5. The light beam entering the focal point position and transverse position detector 5 is split into two beams by the second polarizing beam splitter 28, with one beam entering the focal point position detection system 26 and the other beam entering the transverse position detection system 27. In the focal point position detection system 26 the light beam passes through the lens 16 and half-wavelength plate 17 to the first polarizing beam splitter 15, which splits the incident beam into beams 24 and 25. Light beam 24 converges at focal point position F1, and is diverging as it passes through the first pinhole 18 and forms a spot on the first light detector 31.

Changes in the position of the focal point F1 therefore changes the size of the spot on the first light detector 31. The other light beam 25 formed by the first polarizing beam splitter 15 passes through the second pinhole 22, and after converging at focal point position F2 diverges and forms a spot on the second light detector 32. Thus, changes in the focal point position F2 results in changes in the size of the spot on the second light detector 32. With the part of the other light beam 24 being cut at the first pinhole 18 corresponding to the position of the focal point F1, the quantity of light detected by the first light detector 31 corresponding to the focal point position F1 is as indicated by curve PD1 of FIG. 3. Similarly, with part of the light beam 25 being cut at the second pinhole 22 in accordance with the position of the focal point F1, the quantity of light received by the second light detector 32 corresponding to the focal point position F1 is as indicated by curve PD2 of FIG. 3.

Using (PD2−PD1)/(PD2+PD1) to obtain the difference between the quantities of light detected by the first and second light detectors 31 and 32 provides a curve such as curve b of FIG. 3. As can be seen from curve b, when both focal points are at the reference position the quantities of light detected by light detectors 31 and 32 are the same, producing a zero differential. If the focal points move forwards, that is, towards the light detectors, the light quantity received by the first light position detector 31 increases while the light quantity received by the second light detector 32 decreases (see FIG. 4 (A)), increasing the positive differential between the quantities of light received by the two light detectors. If the two focal points move nearer to the first polarizing beam splitter 15, the quantity of light detected by the first light detector 31 decreases while the quantity of light detected by the second light detector 32 increases (see FIG. 4 (C)), increasing the negative differential between the received light quantities. As these changes in differential between the received light quantities indicated by curve b of FIG. 3, meaning the changes in the position of the focal points, correspond to changes in the position of the focal point of the objective lenses 2 arising from irregularities on the target surface 14, curve b can be used to measure such irregularities on the target surface 14. If the target surface 14 measurement portion at the focal point Fo of the objective lenses 2 is inclined, the outgoing light beam from the second polarizing beam splitter 28 will deviate horizontally from the optical axis. This deviation will produce a shift in the shape of the light spot on the light position detector 36 of the transverse position detection system 27. The inclination of the target surface can therefore be detected by using the light position detector 36 to detect of the centroid position of the shifted spot. When reflected light from a target surface portion having a large inclination is reflected by the mirror 6 of the light beam polariscope 3, the degree of deviation from the optical axis may be so large that the reflected light does not enter the second polarizing beam splitter 28. In such a case, the signal from the light position detector 36 can be used for adjusting the mirror by driving the mirror drive unit 7 to bring the spot centroid back into alignment with the optical axis.

Figure 7:
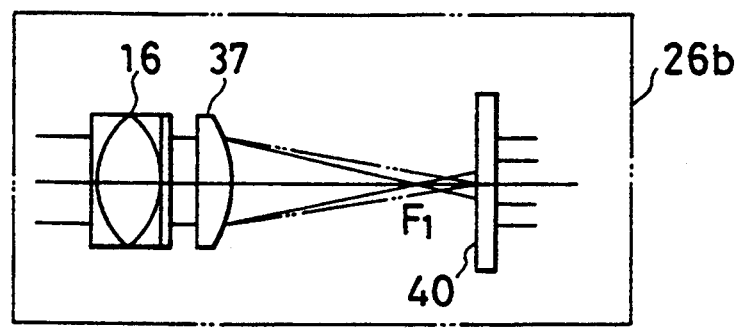
FIG. 7 shows the arrangement of another embodiment of the optical system for detecting the focal point position in the optical displacement sensor of FIG. 6.

The focal point position detection system 26b shown in FIG. 7 can be used instead of the focal point position detection system 26 shown in FIG. 6. The focal point position detection system 26b is arranged so that the outgoing light beam from the second polarizing beam splitter 28 passes through lens 16 and cylindrical lens 37 and forms a spot on the four-piece photodiode 40. By passing the light beam through the cylindrical lens 37, the shape of the spot on the photodiode 40 undergoes changes corresponding to changes in the position of the focal point of the beam, thereby enabling the photodiode 40 to detect the focal point position.

What is claimed is:

1. An optical displacement sensor comprising:
   a light source;
   objective lenses for projecting light from the light source onto a target workpiece surface;
   a light beam polariscope that polarizes reflected light from the target workpiece surface and controls the direction of the outgoing light beam; and
   focal point position and transverse position detection means for splitting the reflected light into first and second light beams to detect focal point positions of the first and second light beams and detect a centroid position of the reflected light.

2. An optical displacement sensor according to claim 1 in which the focal point position and transverse position detection means comprises a beam splitter that splits light from the light beam polariscope into first and second light beams, a first pinhole located on the light path of the first light beam, a first semiconductor light position detector located behind the first pinhole, a second pinhole located on the light path of the second light beam, and a second semiconductor light position detector located behind the second pinhole, wherein the first pinhole is arranged closer to the first semiconductor light position detector than to the focal point position of the first light beam at a reference position, and the second pinhole is arranged closer to the beam splitter than to the focal point position of the second light beam at a reference position.

3. An optical displacement sensor according to claim 1 in which the focal point position and transverse position detection means comprises a beam splitter that splits light from the light beam polariscope into first and second light beams, focal point position detection means that detects a focal point position of the first light beam, and transverse position detection means that detects a transverse position of the second light beam, wherein said focal point position detection means comprises a converging lens located on the light path of the first light beam, a cylindrical lens and a four-piece photodiode.

4. An optical displacement sensor according to claim 1 in which the focal point position and transverse position detection means comprises a second beam splitter that splits light from the light beam polariscope into first and second light beams, focal point position detection means that detects a focal point position of the first light beam and transverse position detection means that detects a transverse position of the second light beam, wherein said focal point position detection means comprises a second beam splitter that splits the first light beam into third and fourth light beams, a first pinhole located on the light path of the third light beam, a first light detector located behind the first pinhole, a second pinhole located on the light path of the fourth light beam and a second light detector located behind the second pinhole, wherein the first pinhole is arranged closer to the first light detector than to the focal point position of the third light beam at a reference position, and the second pinhole is arranged closer to the second beam splitter than to the focal point position of the fourth light beam at a reference position.

5. An optical displacement sensor according to claim 1 in which the focal point position and transverse position detection means comprises a beam splitter that splits light from the light beam polariscope into first and second light beams, focal point position detection means that detects a focal point position of the first light beam, and transverse position detection means that detects a transverse position of the second light beam, wherein said transverse position detection means comprises a converging lens located on the light path of the second light beam, a pinhole and a semiconductor light position detection means.

6. An optical displacement sensor according to claim 1 in which the light beam polariscope is a movable mirror.

7. An optical displacement sensor according to claim 1 in which the light beam polariscope is a crystal optical device.

* * * * *